(12) United States Patent
Lee

(10) Patent No.: US 6,460,064 B1
(45) Date of Patent: Oct. 1, 2002

(54) MULTIPLIER FOR OPERATING N BITS AND N/2 BITS AND METHOD THEREFOR

(75) Inventor: Dong Sun Lee, Suwon (KR)

(73) Assignee: Hyundai Electronics Industries Co. Ltd., Kyoungki-do (KR)

( * ) Notice: Subject to any disclaimer, the term of this patent is extended or adjusted under 35 U.S.C. 154(b) by 0 days.

(21) Appl. No.: 09/280,449

(22) Filed: Mar. 30, 1999

(30) Foreign Application Priority Data

Nov. 2, 1998 (KR) .......................................... 98-46832

(51) Int. Cl.[7] .................................................. G06F 7/52
(52) U.S. Cl. ........................ 708/518; 518/625; 518/629
(58) Field of Search ............................... 708/518, 620, 708/622, 625, 626, 627, 628, 629, 630, 631, 607

(56) References Cited

U.S. PATENT DOCUMENTS

| | | | |
|---|---|---|---|
| 4,825,401 A | * 4/1989 | Ikumi | 708/630 |
| 5,521,856 A | * 5/1996 | Shiraishi | 708/628 |
| 5,586,070 A | 12/1996 | Purcell | |
| 5,751,622 A | * 5/1998 | Purcell | 708/625 |
| 5,880,985 A | * 3/1999 | Makineni et al. | 708/625 |

\* cited by examiner

*Primary Examiner*—Chuong Dinh Ngo
(74) *Attorney, Agent, or Firm*—Morgan, Lewis & Bockius LLP

(57) ABSTRACT

A multiplier for multiplying n bits and n/2 bits is disclosed, wherein a word multiplication is implemented by input of two words. The apparatus includes an encoder receiving the two words and pretreating one of the two words, a partial product generating unit outputting a partial product by multiplying the pretreated word and the unpretreated word from the encoder in accordance with a word control signal, a Wallace tree adder dividing the partial product into first and second output signals, and an adder receiving the first and second output signals and outputting word and byte multiplication output results in accordance with the word control signal.

7 Claims, 6 Drawing Sheets

FIG. 4

| XH | XL | C | DZ | DY | DX |
|----|----|----|----|----|----|
| 0  | 0  | 0  | 0  | 0  | 0  |
| 0  | 0  | 1  | 0  | 0  | 1  |
| 0  | 1  | 0  | 0  | 0  | 1  |
| 0  | 1  | 1  | 0  | 1  | 0  |
| 1  | 0  | 0  | 1  | 1  | 0  |
| 1  | 0  | 1  | 1  | 0  | 1  |
| 1  | 1  | 0  | 1  | 0  | 1  |
| 1  | 1  | 1  | 1  | 0  | 0  |

FIG. 6A  $1 = (WDX + WDY) \cdot Y_{i\_1} \oplus WDZ \oplus W$

FIG. 6B  $2 = (WDX \cdot Y_i + DY \cdot Y_{i\_1}) \oplus WDZ$

FIG. 6C  $3 = (DX \cdot W \cdot Y_i + DX \cdot \overline{W} \cdot Y_{i\_1} + DY \cdot Y_{i\_1}) \oplus DZ \oplus \overline{W}$ FIG. 6D  $4 = (DX \cdot Y_i + DY \cdot Y_{i\_1}) \oplus DZ$ FIG. 6E  $5 = \overline{((DX + DY) \cdot Y_{i\_1} \oplus DZ)}$ FIG. 6F  $6 = (DX \cdot Y_i + DY \cdot W \cdot Y_{i\_1}) \oplus DZ$

FIG. 6G  $7 = VDD$

FIG. 6H  $8 = \overline{W}$

FIG. 6K  $C = \overline{W} \cdot DZ$

FIG. 6L  $D = \overline{W} + DZ$

FIG. 6M  $E = WDZ$

FIG. 6N  $F = DZ$

MULTIPLIER FOR OPERATING N BITS AND N/2 BITS AND METHOD THEREFOR

BACKGROUND OF THE INVENTION

1. Field of the Invention

The present invention relates to a multiplier, and more particularly, to an improved multiplier for multiplying n bits and n/2 bits in accordance with a word control signal.

2. Description of the Background Art

FIG. 1 is a construction view illustrating a conventional multiplier for performing a word multiplication and a byte multiplication, wherein an expansion of two numbers multiplication is implemented using a long-hand form. In order to multiply the two numbers using the long-hand form, a multiplier and a multiplicand are appropriately aligned in number digits. The respective number digits of the multiplier are multiplied by those of the multiplicand and the results are aligned on the basis of the number digits of the multiplier and then the aligned results are appropriately added to obtain the final result.

Using the long-hand form, the product of an 18-bit word A[17:0] and an 18-bit word B[17:0] is obtained as follows:

|  |  | A[17:9] | A[8:0] |
|---|---|---|---|
|  |  | * B[17:9] | B[8:0] |
|  |  | A[17:9]*B[8:0] | A[8:0]*B[8:0] |
| A[17:9]*B[17:9] |  | A[8:0]*B[17:9] |  |
| A[17:9]*B[17:9] + (A[17:9]*B[8:0]+A[8:0]*B[17:9]) + A[8:0]*B[8:0] |

Here, A[17:9] and B[17:9] represent the upper byte and A[8:0] and B[8:0] represent the lower byte of the words A[17:0] and B[17:0], respectively. The expansion of the above is a well-known process and accordingly its discussion will be omitted.

As shown in FIG. 1, the conventional multiplier includes: an input port 100 receiving an 18-bit word A[17:0]; an input port 104 receiving an 18-bit word B[17:0]; a port 102 dividing the 18-bit word A[17:0] into a 9-bit upper byte A[17:9] and a 9-bit lower byte A[8:0]; a port 106 dividing the 18-bit word B[17:0] into a 9-bit upper byte B[17:9] and a 9-bit lower byte B[8:0]; an input port 108 receiving a select signal DEL; a multiplexer 110 receiving the select signal SEL and the 9-bit upper byte A[17:9] of the 18-bit word A[17:0]; a multiplexer 114 receiving the select signal SEL and the 9-bit lower byte B[8:0] of the 18-bit word B[17:0]; a 9-bit multiplier 112 receiving the 9-bit lower byte B[8:0] and the output signal of the multiplexer 110; a 9-bit multiplier 116 receiving the 9-bit lower bytes A[8:0] and B[8:0]; a 9-bit multiplier 118 receiving the 9-bit upper bytes A[17:9] and B[17:9]; a 9-bit multiplier 122 receiving the 9-bit upper byte B[17:9] and the output signal of the multiplexer 114; a concatenation port 120 connecting the respective output signals of the 9-bit multipliers 116, 120; an adder 124 adding the respective output signals of the 9-bit multipliers 112, 124; a concatenation port 126 generating a 36-bit output signal by inserting a plurality of '0's into the upper 8 bits and lower 9 bits in the output signal of the adder 124; a 36-bit adder 128 adding the respective output signals of the concatenation ports 120, 126; and an output port 130 receiving an output signal of the 36-bit adder 128.

The operation of the thusly constituted conventional multiplier will now be described.

When the 18-bit word A[17:0] is applied to the input port 102 and the 18-bit word B[17:0] is applied to the input port 104, the 18-bit word A[17:0] is divided into the 9-bit upper byte A[17:9] and the 9-bit lower byte A[8:0] in the port 102, and the 18-bit word B[17:0] is divided into the 9-bit upper byte B[17:9] and the 9-bit lower byte B[8:0] in the port 106.

At this time, when the select signal SEL becomes a high level, the multiplexers 110, 114 become activated, whereby the respective 9-bit multipliers 112, 116, 118, 122 are operated to perform a 18-bit multiplication. That is, A[17:9]*B[8:0] is performed in the 9-bit multiplier 112 in the 9-bit multiplier 112, A[8:0]*B[8:0] is performed in the 9-bit multiplier 118, and A[8:0]*B[17:9] is performed in the 9-bit multiplier 122. The 18-bit output signals from the 9-bit multipliers 118, 116 are converted to 36-bit output signals (A[17:9]*B[17:9]+A[8:0]*B[8:0]) in the concatenation port 120.

Also, the 18-bit signals from the 9-bit multipliers 112, 122 are added in the adder 124 which then outputs the 19-bit output signal (A[17:9]*B[8:0]+A[8:0]*B[17:9]). Here, the 19-bit output signal is larger than the 18-bit signal applied to the adder 124 since a carry is included.

In the concatenation port 126, a plurality of '0's are inserted into the upper 8 bits and the lower 9 bits of the 19-bit output signal from the adder 124, whereby the 36-bit output signal is generated.

Also, in the adder 128, the respective 36-bit output signals from the concatenation ports 120, 126 are added (A[17:9]*B[17:9]+(A[17:9]*B[8:0]+A[8:0]*B[17:9])+A[8:0]*B[8:0]) a 36-bit output signal Z[35:0]. Here, for convenience's sake, 2's exponents representing number digits are not exposed.

Meanwhile, when the select signal SEL is at a low level, the multiplexers 10 1 10, 114 do not become activated so that the respective 9-bit multipliers 112,122 do not output the output signals, whereas the 9-bit multipliers 118, 116 become activated for thereby outputting the results of A[17:9]*B[17:9] and A[8:0]*B[8:0].

As discussed above, the multiplication results are transmitted in 18-bit output signals to the 36-bit adder 128 through the concatenation port 120.

At this time, the 18-bit upper byte Z[35:18] of the 36-bit output signal from the 33-bit adder 128 is identical to the 18-bit output signal (A[17:9]*B[17:9]) from the 9-bit multiplier 118, and the 18-bit lower byte Z[17:0] is identical to the 18-bit output signal (A[8:0]*B[8:0]) from the 9-bit multiplier 116. Here, for convenience's sake, 2's exponents representing number digits are not multiplied to the result of the 18-bit output signal. Therefore, the conventional multiplier performs 9 bits multiplication and 18 bits multiplication.

However, the conventional multiplier performs four 9-bit multipliers and one 18-bit adder and one 36-bit adder for the 9 bits and 18 bits multiplication, thereby incurring a slow operation speed and disadvantageously requiring a large circuit size.

SUMMARY OF THE INVENTION

The present invention is directed to overcoming the conventional disadvantages. Therefore, it is an object of the present invention to provide a multiplier, capable of performing fast word and byte multiplications by providing a simplified circuit.

To achieve the above-described object, there is provided a multiplier for multiplying n bits and n/2 bits wherein a word multiplication is implemented by input of two words according to the present invention which includes input ports receiving the two words, a port dividing a word at one of the input ports into an upper byte and a lower byte, a port receiving a word control signal, a first encoder receiving the lower byte and a word control signal and outputting a first encoding signal and a second encoding signal, a second encoder receiving the upper byte and the word control signal and outputting a third encoding signal and a fourth encoding signal, a first gating unit receiving the lower byte and a most significant bit of the word and outputting the bit to a carry input terminal of the second encoder in accordance with the word control signal, a partial product generating unit including submodules receiving the first to fourth encoding signals and the word control signal and generating partial products, an operating unit dividing the partial products into a first sum signal, a second sum signal, a first carry word signal and a second carry word signal, a first adder receiving the first sum signal and the first carry word signal and outputting a first carry and a first output signal, a second adder receiving the second sum signal and the second carry word signal and outputting a second carry and a second output signal, a second gating unit receiving the first carry and transmitting the first carry to the second adder in accordance with the word control signal, and an output port outputting the first output signal and the second output signal.

Further, to achieve the above-described object, there is provided a multiplier for multiplying n bits and n/2 bits wherein a word multiplication is implemented by input of two words according to the present invention which includes input ports receiving the two words, a port dividing a word at one of the input ports into an upper byte and a lower byte, a port receiving a word control signal, a first encoder receiving the lower byte and a word control signal and outputting a first encoding signal and a second encoding signal, a second encoder receiving the upper byte and the word control signal and outputting a third encoding signal and a fourth encoding signal, a partial product generating unit including submodules receiving the first to fourth encoding signals and the word control signal and generating partial products, an operating unit dividing the partial products into a first sum signal, a second sum signal, a first carry word signal and a second carry word signal, a first adder receiving the first sum signal and the first carry word signal and outputting a first carry and a first output signal, a second adder receiving the second sum signal and the second carry word signal and outputting a second carry and a second output signal, and an output port outputting the first output signal and the second output signal.

Still further, to achieve the above-described object, there is provided a method for multiplying n bits and n/2 bits wherein a word multiplication is implemented by input of two words according to the present invention which includes a first step for applying a 16-bit first word and a 16-bit second word to two input ports and dividing the first word among the first and second words into an 8-bit upper byte and an 8-bit lower byte, a second step for receiving the 8-bit lower byte and the 8-bit upper byte, generating a pair of 4-bit first, second and third encoding signals, and a pair of 4-bit first, second and third word encoding signals when the word control signal is at a high level, and generating a pair of 4-bit first, second and third encoding signals when the word control signal is at a low level, a third step for transmitting the most significant bit of the lower byte to the encoder outputting the 4-bit first, second and third encoding and word encoding signals when the word control signal is at a high level, a fourth step for receiving the first to third encoding signals and the first to third word encoding signals and the word control signal, generating a word partial product when the word control signal is at a high level, and generating a byte partial product when the word control signal is at a low level, a fifth step for receiving the partial products and dividing the same into respectively two upper word partial products, the lower word partial products, the upper carry word partial product and the lower carry word partial product, a sixth first step for adding the lower word partial product and the lower carry word partial product, a seventh step for adding the lower word partial product and the lower carry word partial product, and a eighth step for transmitting the carry outputted in the sixth step to the seventh step in accordance with the high level word control signal.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein:

FIG. 4 is a logic table illustrating a cell function in FIG. 3;

FIGS. 6A–6N are logic expressions.

DETAILED DESCRIPTION OF THE PREFERRED EMBODIMENTS

In order to multiply a 16-bit first word X[15:0] and a 16-bit second word Y[15:0], the present invention performs a word multiplication (X[15:0]*Y[15:0]=Z[32:0]) and a byte multiplication (X[15:8]*Y[15:]=Z[31:15]) or X[7:0]*Y[7:0]=Z[15:0]) in accordance with a word control signal W.

Figure 1:
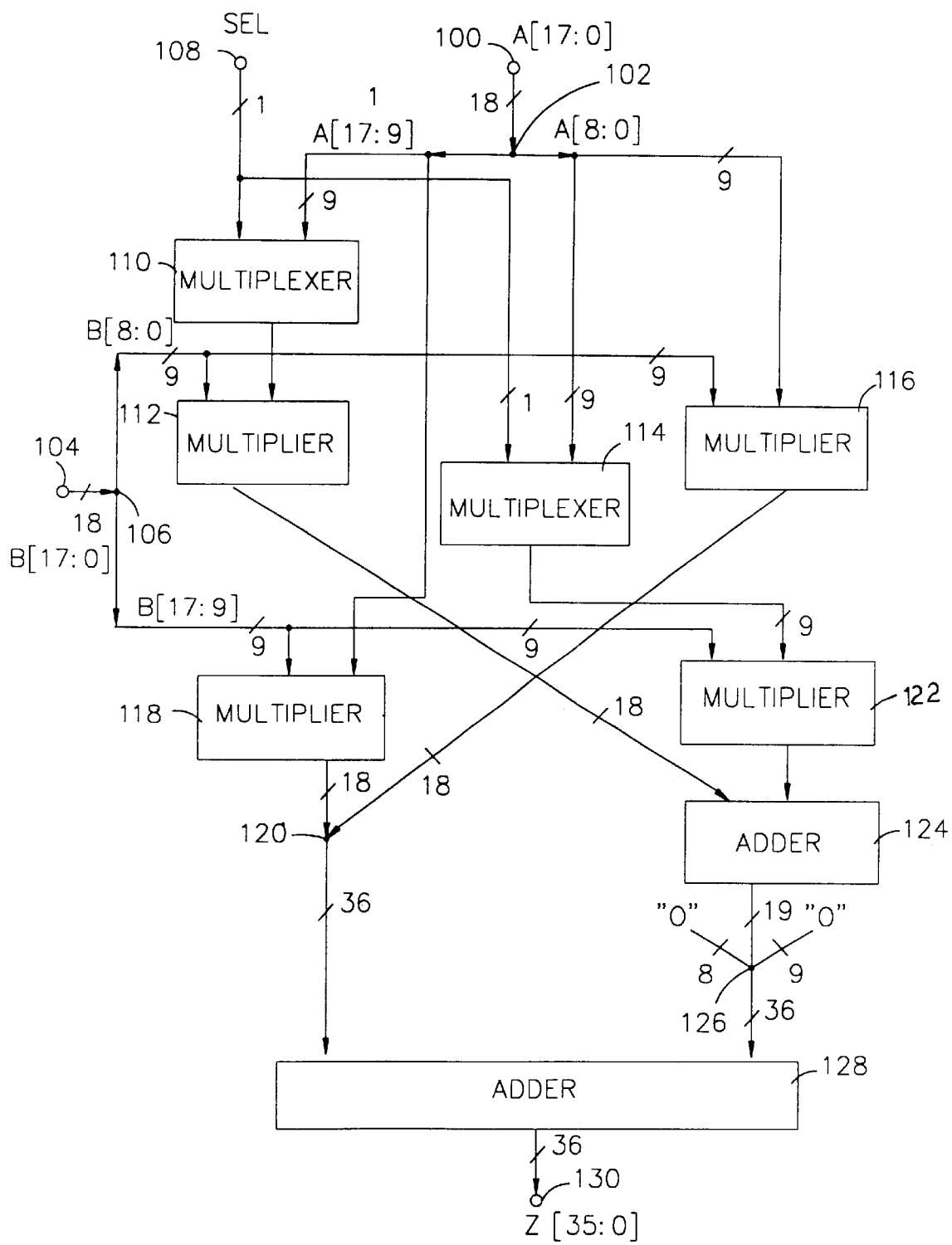
FIG. 1 is a construction view illustrating a multiplier for performing word and byte multiplications according to the conventional art.
Figure 2:
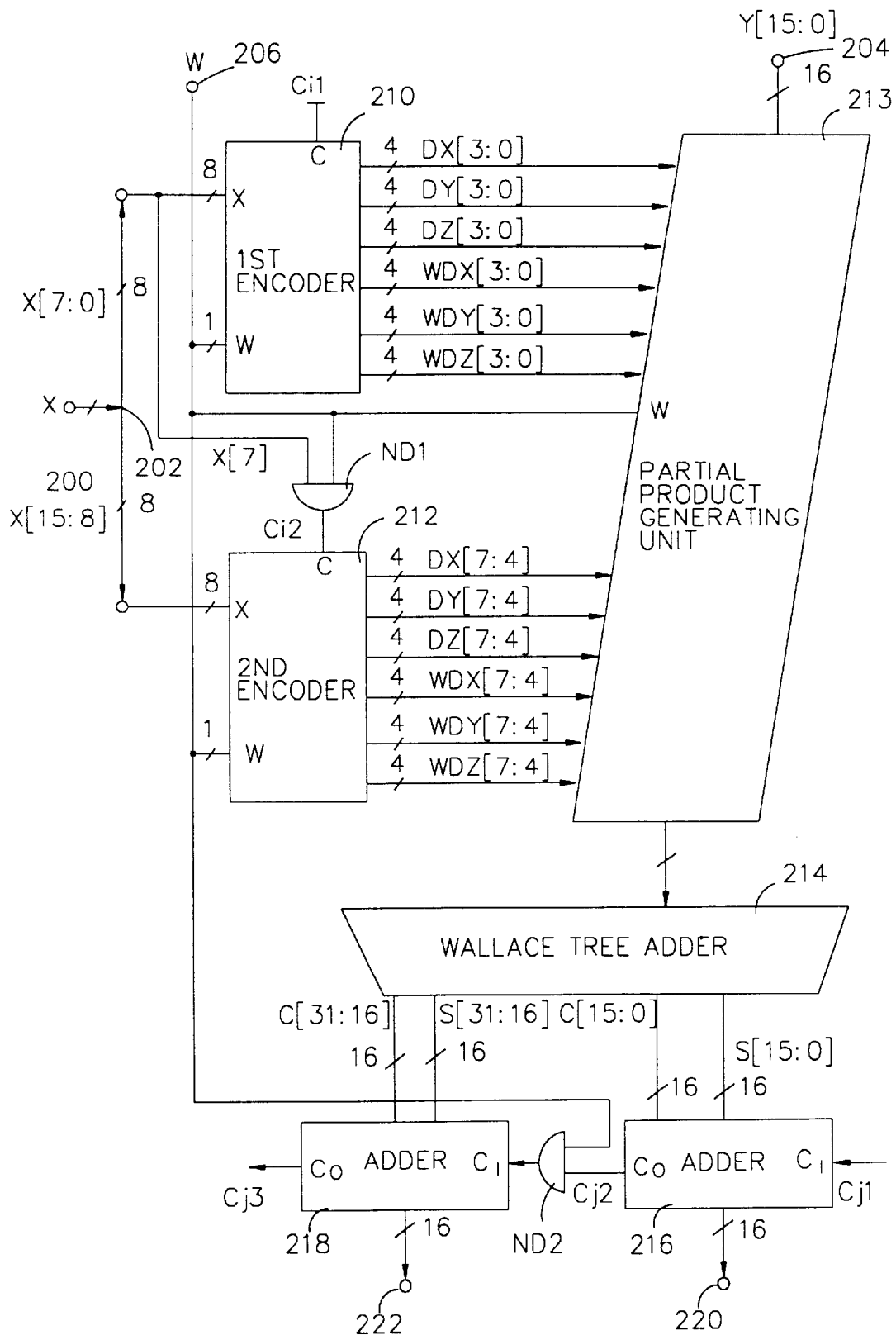
FIG. 2 is a construction view illustrating a multiplier for performing word and byte multiplications according to the present invention.

FIG. 2 is a construction view illustrating a multiplier for performing word and byte multiplications according to the present invention. As shown therein, the multiplier includes: input ports 200, 204 receiving a 16-bit first word X[15:0] and a 16-bit second word Y[15:0]; an input port 206 receiving a one-bit word control signal W; a port 202 dividing the first word X[15:0] from the input port 200 into a 8-bit upper byte X[15:8] and a 8-bit lower byte X[7:8]; a first encoder 210 receiving the lower byte X[7:8] of the first word X[15:0]) and one bit carry signal Ci1, and outputting four lower bits DX[3:0] of a first encoding signal DX[7:0], four lower bits DY[3:0] of a second encoding signal DX[7:0], four lower bits DZ[3:0] of a third encoding signal DX[7:0], four lower bits WDX[3:0] of a first word encoding signal WDX[7:0], four lower bits WDY[3:0] of a second word encoding signal WDY[7:0], and four lower bits WDZ

[3:0] of a third word encoding signal WDZ[7:0], in accordance with the word control signal W; a first NAND gate ND1 receiving the most significant bit X[7] of the lower byte X[7:8] of the first word X[15:0] and the word control signal W and outputting one-bit carry signal Ci2; a second encoder 212 receiving the 8-bit upper byte X[15:8] of the first word X[15:0] and the carry signal Ci2, and outputting four upper bits DX[7:4] of the first encoding signal DX[7:0], four upper bits DY[7:4]) of the second encoding signal DX[7:0], four upper bits DZ[7:4] of the third encoding signal DX[7:0], four upper bits WDX[7:4] of the first word encoding signal WDX[7:0], four upper bits WDY[7:4] of the second word encoding signal WDY[7:0]), and four upper bits WDZ[7:4] of the third word encoding signal WDZ[7:0], in accordance with the word control signal W; a partial product generating unit 213 receiving the second word Y[15:0], the 8-bit first encoding signal DX[7:0]), the 8-bit second word encoding signal WDY[7:0], the 8-bit third word encoding signal WDZ[7:0], the 8-bit first word encoding signal WDX[7:0], the 8-bit second word encoding signal WDY[7:0], and the 8-bit third word encoding signal WDZ[7:0], and performing the bit and word multiplications in accordance with the word control signal W; a Wallace tree adder 214 receiving the output signal of the partial product generating unit 213 and outputting a 32-bit word partial product S[31:0] and a 32-bit carry word partial product C[31:0]; a first adder 216 receiving the 16-bit lower word partial product S[15:0] and the 16-bit lower carry word partial product C[15:0] of the 32-bit word partial product S[31:0] and the 32-bit carry word partial product C[31:0] from the Wallace tree adder 214, and the carry Cj1 and outputting another carry Cj2 and the lower word product Z[15:0]; a second NAND gate ND2 NANDing the carry from the first adder 216 and a high level word control signal and outputting the carry Cj2; a second adder 218 receiving the 16-bit upper word partial product S[31:16] and the 16-bit upper carry word partial product C[31:16] of the 32-bit word partial product S[31:0] and the 32-bit carry word partial product C[31:0] from the Wallace tree adder 214 and applying the output signal of the second NAND gate ND2 to a carry input terminal and then outputting another carry Cj3 and the upper word product Z[31:16]; and input ports 220, 222 respectively receiving the lower word product Z[15:0] and the upper word product Z[31:16].

Figure 3:
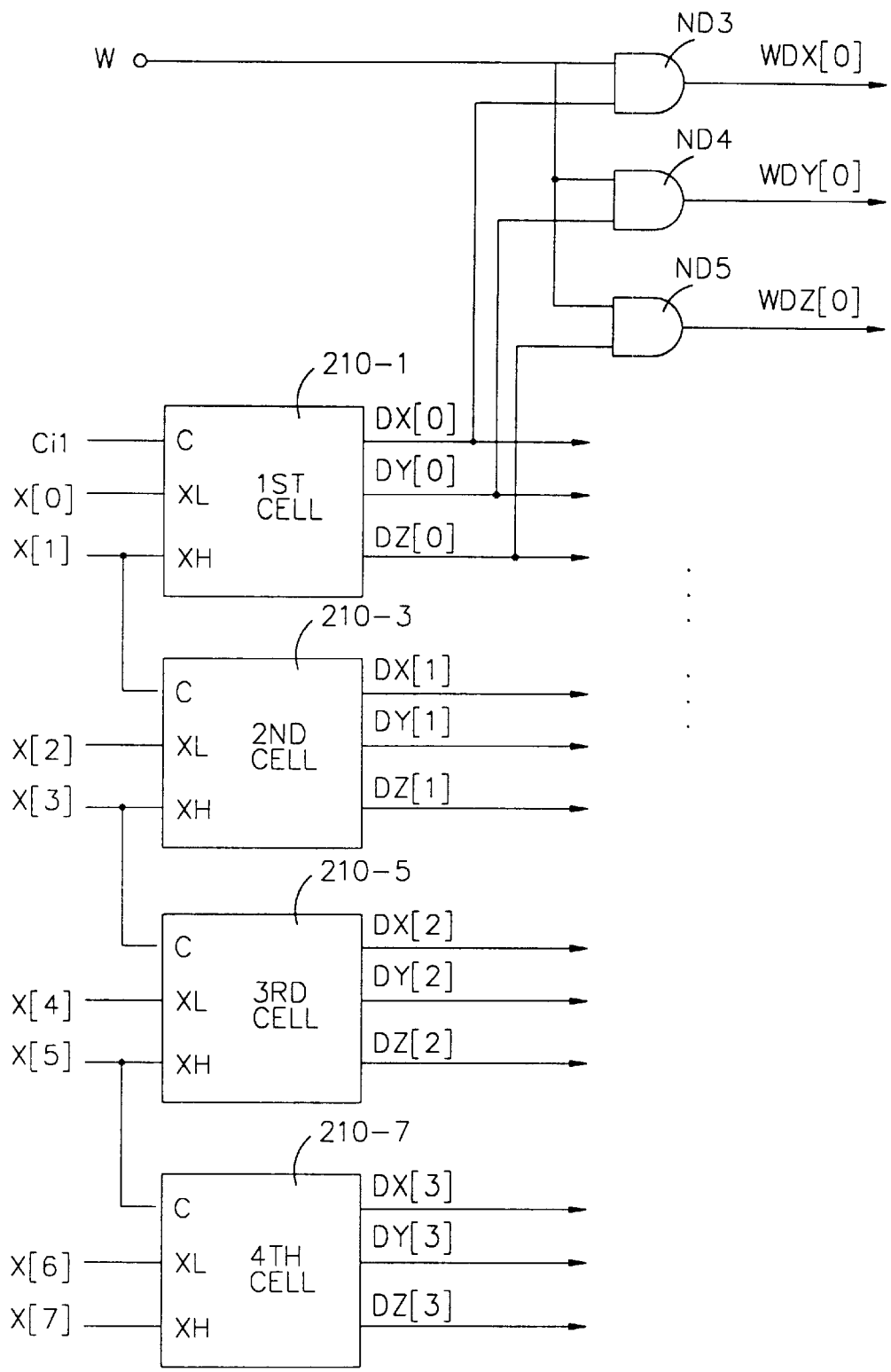
FIG. 3 is a construction view detailing a first encoder in FIG. 2.

FIG. 3 shows a view detailing the first encoder 210 in FIG. 2. As shown therein, the first encoder 210 includes: a first cell 210-1 receiving X[0] and X[1] of the 8-bit lower byte X[7:0] of the first word X[15:0] and the carry Ci1, and outputting DX[0] bit of the first encoding signal DX[7:0], DY[0] bit of the second encoding signal DY[7:0], and DZ[0] bit of the third encoding signal DZ[7:0]; a second cell 210-3 receiving X[2] and X[3] of the 8-bit lower byte X[7:8] and the X[1] bit through the carry input terminal, and outputting DX[1] bit of the first encoding signal DX[7:0], DY[1] bit of the second encoding signal DY[7:0], and DZ[1] bit of the third encoding signal DZ[7:0]; a third cell 210-5 receiving X[4], X[5] and X[3] of the 8-bit lower byte X[7:8] and outputting DX[2], DY[2], DZ[2]; and a fourth cell 210-7 receiving X[6], X[7] and X[5] of the 8-bit lower byte X[7:0] outputting DX[3], DY[3], DZ[3]. The second encoder 210 further includes NAND gates ND3, ND4, ND5 connected to the respective output terminals of the first cell, receiving the encoding signals DX[0], DY[0], DZ[0] and the word control signal W and outputting the least significant bits WDX[0], WDY[0], WDZ[0]. Likewise, although not shown in the drawing, the second to fourth cells are respectively connected to NAND gates connected to the output terminals thereof and NANDing the output signals therefrom and the word control signal and outputting the corresponding bits as encoding signals.

The second encoder 212 in FIG. 2 is similar to the first encoder 210 in construction. However, the input signal is an 8-bit upper byte X[15:8] of the first word X[15:0].

FIG. 4 is a logic table representing the function of the cells in FIG. 3, wherein XH, XL respectively represent an upper bit input terminal and a lower bit input terminal to the respective cells, and C represents a carry bit input terminal. DX and DY represent output terminals of the encoding bit signals from the respective cells, and DZ represents an encoding bit signal. As shown therein, the logic table will now be described.

When no carry is inputted (C=0), the cell output values become 0, 1, −2, −1 in decimal number (DY×$2^1$+DX×1) in accordance with the combination of bit values applied to the cell input terminals XH, XL. When there is a carry (C=1), the cell output values become 1, 2, −1, 0.

Figure 5:
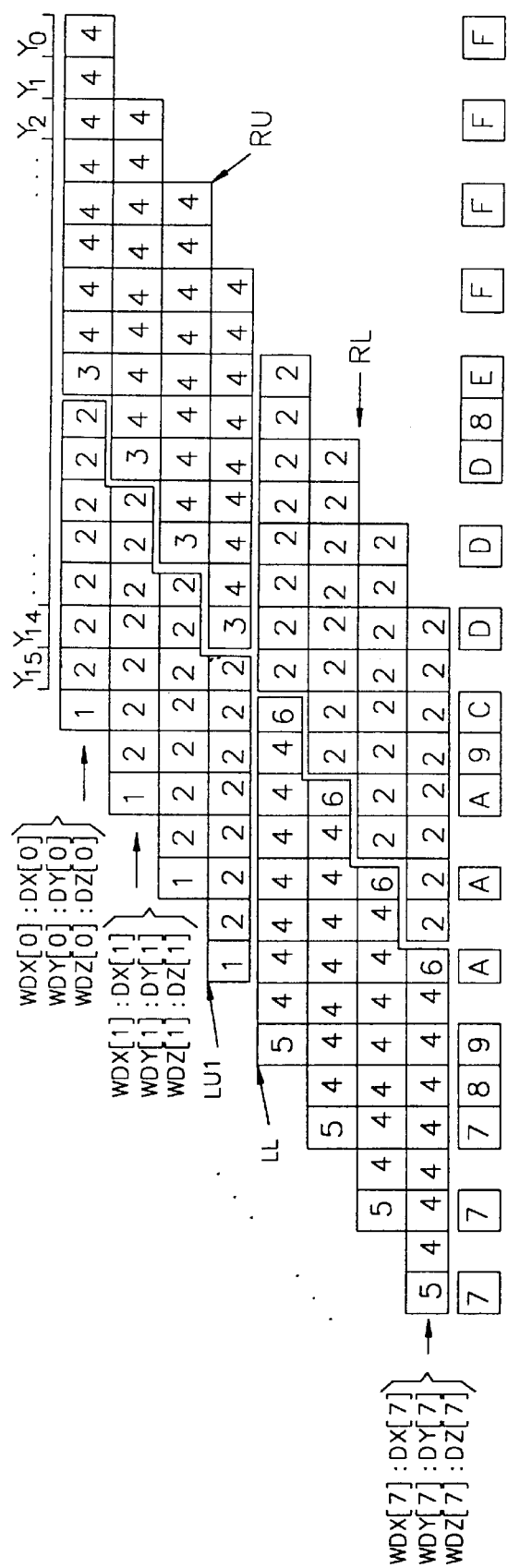
FIG. 5 is a view illustrating a submodule arrangement in a partial product generating unit in FIG. 2.

FIG. 5 is a view detailing the partial product generating unit 213, wherein 15 submodules are illustrated. As shown therein, the squares each including numbers (1, 2, . . . 9) and alphabets (A, C, D, E, F) are submodules partially multiplying the first word X[15:0] pretreated by the encoders 210, 212 and the second word Y[15:0] from the input port 204. At this time, the submodules in identical numbers and alphabets perform the same operation. Here, the submodules become geometrically arranged while aligning the number digits of the input numbers.

The thusly aligned submodules are divided into five sections: a left upper section LU including submodules 1 and 2, a right upper section RU including submodules 3, 4, a left lower section including submodules 4, 5, 6, a right left section RL including the submodule 2, and the remaining section including submodules 7, 8, 9, A, B, C, D, E, F.

FIGS. 6A through 6N show logic expressions illustrating the function of the submodules in FIG. 5, wherein logics are implemented into respective circuits to realize the submodules. For example, as shown in FIG. 6A with regard to the submodule 1, the first word encoding signal WDX and the second encoding signal WDY of the first word are logically summed and multiplied by the second word Yi—1. The resultant logic product is XORed with the third output signal WDZ of the first word X and the result is again XORed with the word control signal W. Likewise, the respective submodules in FIGS. 6B through 6N can be understood.

Here, DX, DY, DZ denote first, second, third output signals, WDX, WDY, WDZ denote first, second, third word output signals, and W, $\overline{W}$ denote word control signals. Also, Yi, Yi_1 represent the second word, wherein Yi denotes a signal corresponding to number digits of the second word Y. The number digits of the second word have a two-digit difference between columns of the submodules, and Yi_1 represents one-digit difference with regard to the second word number digits between the submodule columns The operation of the multiplier according to the present invention will now be described in further detail with reference to the accompanying drawings.

In the word multiplication mode wherein the word control signal W equals 1, the multiplier according to the first embodiment of the present invention performs the word multiplication as follows.

The first and second encoders respectively receiving the lower byte X[7:8] and the upper byte X[15:8] of the first word X[15:0] output the first, second and third 8-bit encoding signals DX[7:0], DY[7:0] and DZ[7:0], and output the first, second and third word encoding signals WDX[7:0], WDY[7:0] and W. Then, the partial product generating unit 213 receives the Y[15:0], the first, second and third encoding signals DX[7:0], DY[7:0] and DZ[7:0] from the first and second encoders, and the first, second and third word encoding signals WDX[7:0], WDY[7:0] and WDZ[7:0], and the high level word control signal(W=1), thereby generating the partial product in accordance with the circuit designed as the logic expressions of the submodules in FIGS. 6A–6N.

At this time, when the output signals of the first and second encoders are negative numbers (DZ=1 or WDZ=1), the submodules D, E, F add 1 to the least significant bit LSB of one column among the partial products to process the complement number of the second word Y[15:0]. Also, the submodules 7, 9, A represent submodules operating during the word multiplication.

The Wallace tree adder 214 receiving the partial products obtained above outputs the upper word partial product S[31:16] and the lower word partial product S[15:0], and also outputs the upper carry word partial product C[31:16] and the lower carry word partial product C[15:0].

The adder 216 receives the lower word output signal S[15:0] and the lower carry word partial product C[15:0] and the carry Cj1 through the carry input terminal and outputs the lower output signal Z[15:0] and the other carry Cj2. The adder 218 receives the upper word output signal S[31:16] and the upper carry word partial product C[31:16] and the carry Cj2 of the lower adder 216 transmitted by the high level word control signal and outputs the output signal X through the carry input terminal and outputs the output signal Z[31:16].

The multiplier according to the present invention receives the 16-bit first word X[15:0] and the 16-bit second word Y[15:0] in the word multiplication mode wherein the word control signal W equals 1, and performs X[15:0]*Y[15:0].

The multiplier according to the second embodiment of the present invention performs the following byte multiplication in the byte multiplication mode wherein the word control signal W equals 0.

As discussed above, when the word control signal W equals 0, the first and second encoders which pretreat the first word X[15:0] output the first, second and third encoding signals DX[7:0], DY[7:0] and DZ[7:0], whereas the first and second NAND gates ND1, ND2 do not operate.

In the partial product generating unit 213 receiving the first, second and third encoding signals DX[7:0], DY[7:0] and DZ[7:0], the left upper section LU and the right left section of the submodules in FIG. 5 do not operate. To the contrary, the right upper section RU and the left upper section LL of the submodules perform the logic expressions in FIG. 6A–6N. At this time, the submodule 3 in the right upper section RU treats the symbol of the partial product, and the submodule 6 in the left upper section treats the least significant bit LSB.

The submodules A, C treat the complement numbers during the upper byte multiplication, the submodule F treats the complement number during the lower byte multiplication. The submodules 7, 8 are operated when the upper bytes perform the multiplication, and the submodules D, 8 are operated during the lower byte multiplication.

The Wallace tree adder 214 receiving the partial products outputs the upper word partial product S[31:16], the lower word partial product S[15:0], the upper carry word partial product C[31:16] and the lower carry word partial product C[15:0].

Then, the adder 216 receives the lower word partial product S[15:0], the lower carry word partial product C[15:0] and outputs the lower output signal Z[15:0] and the other carry Cj2. Also, the adder 218 receives the upper word partial product S[31:16], the upper carry word partial product C[31:16] and outputs the upper output signal Z[31:16] and the other carry Cj3.

According to the second embodiment of the present invention, the byte multiplication results in the product X[15:8]*Y[15:8] of the 8-bit upper byte X[15:8] of the first word X[15:0] and the 8-bit upper byte Y[15:8] of the second word Y[15:0], and the product X[7:0]*Y[7:0] of the 8-bit lower byte X[7:0] of the first word X[15:0] and the 8-bit lower byte Y[7:0] of the second word Y[15:0].

Therefore, the multiplier according to the present invention receives two words and pretreats one of the two words. Then, the word and byte multiplications are performed in the partial product generating unit including the submodules, in accordance with the word control signal.

According to the third embodiment of the present invention, the method of byte and word multiplications with regard to two words X[15:0], Y[15:0] includes: a step for applying a 16-bit first word X[15:0] and a 16-bit second word Y[15:0] to the two input ports 200, 204 and dividing the first word X[15:0] among the first and second words into an 8-bit upper byte X[15:8] and an 8-bit lower byte X[7:0]); a step for receiving the 8-bit lower byte X[7:8] and the 8-bit upper byte X[15:8], generating a pair of 4-bit first, second and third encoding signals (DX[7:4], DY[7:4], DZ[7:4]), (DX[3:0], DY[3:0], DZ[3:0]), and a pair of 4-bit first, second and third word encoding signals (WDX[7:4], WDY[7:4], WDZ[7:4]),(WDX[3:0], WDY[3:0], WDZ[3:0]) when the word control signal is at a high level (W=1), and generating a pair of 4-bit first, second and third encoding signals (DX[7:4], DY[7:4], DZ[7:4]),(DX[3:0], DY[3:0], DZ[3:0]) when the word control signal is at a low level (W=0); a step for transmitting the most significant bit X[7] of the lower byte X[7:8] to the encoder outputting the 4-bit first, second and third encoding and word encoding signals (DX[7:4], DY[7:4], DZ[7:4]),(WDX[7:4], WDY[7:4], WDZ[7:4]) when the word control signal is at a high level; a step for receiving the first to third encoding signals and the first to third word encoding signals and the word control signal, generating a word partial product when the word control signal is at a high level, and generating a byte partial product when the word control signal is at a low level; a step for receiving the partial products and dividing the same into respectively two upper word partial products, the lower word partial products, the upper carry word partial product and the lower carry word partial product; a first step for adding the lower word partial product and the lower carry word partial product; a second step for adding the lower word partial product and the lower carry word partial product; and a step for transmitting the carry outputted in the first step to the second step in accordance with the high level word control signal.

As described above, the multiplier according to the present invention realizes a fast performance by implementing the word multiplication and the byte multiplication into a single circuit while decreasing the circuit area in design. Also, those skilled in the art will easily modify the preferred embodiments of the present invention into a double word multiplication, word multiplication and byte multiplication.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A multiplier for multiplying n bits and n/2 bits wherein a word multiplication is implemented by input of two words, comprising:

a first encoder receiving the lower byte and a word control signal and outputting a first encoding signal and a second encoding signal which is the result of NANDing the first encoding signal and the word control signal;

a second encoder receiving the upper byte and the word control signal and outputting a third encoding signal and a fourth encoding signal which is the result of NANDing the third encoding signal and the word control signal;

a partial product generating unit including submodules receiving the first to fourth encoding signals and the word control signal and generating partial products;

an operating unit receiving the partial products and outputting a first sum signal, a second sum signal, a first carry word signal and a second carry word signal;

a first adder receiving the first sum signal and the first carry word signal and outputting a first carry and a first output signal; and a second adder receiving the second sum signal and the second carry word signal and outputting a second carry and a second output signal.

2. The apparatus of claim 1, wherein the two words are 16 bits respectively, and the upper and lower bytes are 8 bits respectively.

3. The apparatus of claim 1, wherein each of the first, second, third and fourth encoding signals is 4 bits.

4. The apparatus of claim 3, wherein the first encoder comprises:

four cells receiving 2 bits from the 8-bit upper byte and applying an upper bit of the 2 bits to a carry input terminal thereof, and sequentially outputting the 4 bit first encoding signal to three output terminals; and NAND gates NANDing three first encoding signals from the three output terminals and the word control signal and outputting a 4-bit second encoding signal.

5. The apparatus of claim 4, wherein when the respective cells have no carry and the input 2 bits are 0, 1, 2, 3 in decimal number, the cells output 0, 1, −2, −1 in decimal number, respectively; and when the respective cells have carry and the input 2 bits are 0, 1, 2, 3 in decimal number, the cells output 0, 1, −1, −0 in decimal number, respectively.

6. The apparatus of claim 1, wherein the operating unit is a Wallace tree adder.

7. A method of a word multiplication for multiplying n bits and n/2 bits wherein the word multiplication is implemented by input of two words, comprising:

a first step for applying a 16-bit first word and a 16-bit second word to two input ports and dividing the first word among the first and second words into an 8-bit upper byte and an 8-bit lower byte;

a second step for receiving the 8-bit lower byte and the 8-bit upper byte, generating pairs of 4-bit first, second and third encoding signals, and pairs of 4-bit first, second and third word encoding signals when the word control signal is at a high level, and generating pairs of 4-bit first, second and third encoding signals when the word control signal is at a low level;

a third step for transmitting the most significant bit of the lower byte to an encoder outputting the 4-bit first, second and third encoding and word encoding signals when the word control signal is at a high level;

a fourth step for receiving the first to third encoding signals and the first to third word encoding signals and the word control signal, generating a word partial product when the word control signal is at a high level, and generating a byte partial product when the word control signal is at a low level;

a fifth step for receiving the partial products and dividing the same into respectively two upper word partial products, the lower word partial products, the upper carry word partial product and the lower carry word partial product;

a sixth step for adding the lower word partial product and the lower carry word partial product;

a seventh step for adding the lower word partial product and the lower carry word partial product; and a eighth step for transmitting the carry outputted in the sixth step to the seventh step in accordance with the high level word control signal.

* * * * *